US012739024B2

(12) United States Patent
Hong et al.

(10) Patent No.: US 12,739,024 B2
(45) Date of Patent: Sep. 15, 2026

(54) INTELLIGENT TRANSPORTATION SYSTEM USING MULTI-LAYER SATELLITE AND COMMUNICATION METHOD USING THE SAME

(71) Applicant: University-Industry Cooperation Group of Kyung Hee University, Gyeonggi-do (KR)

(72) Inventors: Choong Seon Hong, Gyeonggi-do (KR); Hassan Sheikh Salman, Gyeonggi-do (KR); Yu Min Park, Gyeonggi-do (KR)

(73) Assignee: University-Industry Cooperation Group of Kyung Hee University, Gyeonggi-do (KR)

( * ) Notice: Subject to any disclaimer, the term of this patent is extended or adjusted under 35 U.S.C. 154(b) by 318 days.

(21) Appl. No.: 18/439,934

(22) Filed: Feb. 13, 2024

(65) Prior Publication Data

US 2025/0096888 A1 Mar. 20, 2025

(30) Foreign Application Priority Data

Sep. 20, 2023 (KR) ........................ 10-2023-0125939

(51) Int. Cl.
*H04B 7/185* (2006.01)

(52) U.S. Cl.
CPC ..... *H04B 7/18519* (2013.01); *H04B 7/18513* (2013.01)

(58) Field of Classification Search
CPC ............ H04B 7/18519; H04B 7/18513; H04B 7/1851; H04B 7/18517; H04W 28/084; H04W 28/086
See application file for complete search history.

(56) References Cited

U.S. PATENT DOCUMENTS

2003/0036349 A1* 2/2003 Wu .................... H04B 7/18515 455/12.1
2016/0330259 A1* 11/2016 Sebastian .............. H04L 65/611
2024/0259086 A1* 8/2024 Buer .................. H04B 7/18513

FOREIGN PATENT DOCUMENTS

KR 10-0842465 B1 7/2008

OTHER PUBLICATIONS

Changhong Wang et al. "An overview of protected satellite communications in intelligent age", Science China Information Sciences, Jun. 2021, vol. 64, No. 161301, pp. 1-18, DOI:10.1007/s11432-019-2928-9). (Year: 2021).*

(Continued)

*Primary Examiner* — John J Lee
(74) *Attorney, Agent, or Firm* — The PL Law Group, PLLC

(57) ABSTRACT

An intelligent transportation system uses a multi-layer satellite. The intelligent transportation system according to an embodiment includes a first satellite, a second satellite that is different from the first satellite in one or more of a communication coverage, a communication cost, and a communication-related resource, a third satellite that is different from the first satellite and the second satellite in one or more of the communication coverage, the communication cost, and the communication-related resource, and one or more mobile nodes that perform data communication with one or more of the first satellite, the second satellite, and the third satellite, and are means of equipped with communication equipment.

15 Claims, 4 Drawing Sheets

(56) References Cited

OTHER PUBLICATIONS

Office action issued on Aug. 20, 2025 from Korean Patent Office in a counterpart Korean Patent Application No. 10-2023-0125939 (English translation is also submitted herewith.).
Changhong Wang, et al., An overview of protected satellite communications in intelligent age, Science China Information Sciences, Jun. 2021, vol. 64, No. 161301, pp. 1-18, DOI:10.1007/s11432-019-2928-9.
Zaigham Mahmood. Connected Vehicles in the Internet of Things, Springer, Jan. 14, 2020, DOI:10.1007/978-3-030-36167-9.

* cited by examiner

INTELLIGENT TRANSPORTATION SYSTEM USING MULTI-LAYER SATELLITE AND COMMUNICATION METHOD USING THE SAME

CROSS-REFERENCE TO RELATED APPLICATION AND CLAIM OF PRIORITY

This application claims the benefit under 35 USC § 119 of Korean Patent Application No. 10-2023-0125939, filed on Sep. 20, 2023, in the Korean Intellectual Property Office, the entire disclosure of which is incorporated herein by reference for all purposes.

BACKGROUND

1. Field

Embodiments of the present disclosure relate to an intelligent transportation system using a multi-layer satellite and a communication method using the same.

2. Description of Related Art

The present invention was supported by the national research and development program (Project identification number: 1711179316; Project number: 00155911; Department name: Ministry of Science and ICT; Project management (professional) organization name: Information and Communications Planning and Evaluation Institute; Research program title: Artificial intelligence convergence innovation human resources training; Research project title: Artificial intelligence convergence innovation talent training (Kyung Hee University); Contribution ratio: 1/4; Project execution organization name: Korea University Industry-Academic Cooperation Foundation, Ltd.; Research period: 2023.01.01 to 2023.12.31), (Project identification number: 1711193491; Project number: 2019-0-01287-005; Department name: Ministry of Science and ICT; Project management (professional) organization name: Information and Communications Planning and Evaluation Institute; Research program title: SW computing industry source technology development; Research project title: (SW Star Lab) Evolutionary deep learning model generation platform for distributed edge; Contribution ratio: 1/4; Project execution organization name: Korea University Industry-Academic Cooperation Foundation, Ltd.; Research period: 2023.01.01 to 2023.12.31), (Project identification number: 1711194179; Project number: 00207816; Department name: Ministry of Science and ICT; Project management (professional) organization name: National Research Foundation of Korea; Research program title: Group research support; Research project title: Development of core structure of Satellite-Air-Ground integrated networking system based on Meta Federated Learning; Contribution ratio: 1/4; Project execution organization name: Korea University Industry-Academic Cooperation Foundation, Ltd.; Research period: 2023 Mar. 1 to 2024 Feb. 29), and (Project identification number: 1711193622; Project number: 2021-0-02068-003; Department name: Ministry of Science and ICT; Project management (professional) organization name: Information and Communication Broadcasting Innovative Human Resources Training; Research program title: Information and Communication Broadcasting Innovative Human Resources Training; Research project title: Artificial intelligence innovation hub research and development; Contribution ratio: 1/4; Project execution organization name: Korea University Industry-Academic Cooperation Foundation, Ltd.; Research period: 2023.01.01~2023.12.31) awarded by Ministry of Trade, Industry and Energy.

Terrestrial access network (TAN) is utilized for an economic advantage in developed regions with high population density. However, the terrestrial access networks (TAN) cannot cover large video image, maritime, and desert areas due to lack of availability of a network infrastructure. As the 6G network will provide applications in various fields such as transportation, industry, and energy, it becomes important to expand communication connections to other regions in order to develop future networks. Accordingly, a plan to utilize satellites to build a network infrastructure independent of the Earth's surface is required.

SUMMARY

Embodiments of the present disclosure are intended to provide an intelligent transportation system using a multi-layer satellite and a communication method using the same.

An intelligent transportation system according to an exemplary embodiment of the present disclosure is an intelligent transportation system using satellites and includes a first satellite, a second satellite that is different from the first satellite in one or more of a communication coverage, a communication cost, and a communication-related resource, a third satellite that is different from the first satellite and the second satellite in one or more of the communication coverage, the communication cost, and the communication-related resource, and one or more mobile nodes that perform data communication with one or more of the first satellite, the second satellite, and the third satellite, and are means of transportation equipped with communication equipment.

The first satellite may have a first communication coverage, a first communication cost, and a first communication-related resource, the second satellite may have a second communication coverage narrower than the first communication coverage, a second communication cost less than the first communication cost, and a second communication-related resource that is smaller than the first communication-related resource, and the third satellite may have a third communication coverage narrower than the second communication coverage, a third communication cost less than the second communication cost, and a third communication-related resource smaller than the second communication-related resource.

The second satellite may have the second communication coverage within the first communication coverage of the first satellite, the third satellite may have the third communication coverage within the second communication coverage of the second satellite, each of the first satellite, the second satellite, and the third satellite may be prepared to support a mobile edge computing (MEC) function, and the mobile node may transmit an offloading task to one or more of the first satellite, the second satellite, and the third satellite.

Each of the first satellite, the second satellite, and the third satellite may include a computing unit for processing the offloading task and a scheduler for scheduling an order of the offloading tasks.

The first satellite, when receiving the offloading task from the mobile node, may check whether the second satellite and the third satellite are present within the first communication coverage of the first satellite and allocate the offloading task to one or more of the second and third satellites within the first communication coverage.

The first satellite may allocate the offloading task to one or more of the second satellite and the third satellite in consideration of one or more of a communication-related resource, communication bandwidths, communication costs, and offloading task processing deadlines of the second and third satellites within the first communication coverage.

The first satellite may optimize selection of a satellite to perform the offloading task, the communication bandwidth, and allocation of the communication-related resource while minimizing a processing time of the offloading task and the communication cost, and may optimize the selection of the satellite to perform the offloading task, the communication bandwidth, and the allocation of the communication-related resource using a multi-agent reinforcement learning model in which each satellite serves as an agent.

The multi-agent reinforcement learning model may include a policy network that decides an action of the agent based on a preset policy for input state information, and a value network that provides feedback on the action decided by the policy network to update the policy, the state information may include satellite state information and node state information, the satellite state information may include one or more of a location of each satellite, a communication-related resource of each satellite, a communication bandwidth of each satellite, a communication cost of each satellite, and a communication range of each satellite, and the node state information may include one or more of a location of each mobile node, an offloading workload requested by each mobile node, and a deadline of the offloading task set by each mobile node.

The multi-agent reinforcement learning model may further include an attention network that receives the satellite state information, the node state information, and the action decided by the policy network, and generates an attention weight of other agents related to reward for the action based on the satellite state information, the node state information, and the action decided by the policy network.

A communication method according to another exemplary embodiment of the present disclosure is a communication method of an intelligent transportation system including a first satellite, a second satellite, a third satellite, and a mobile node, in which the first satellite has a first communication coverage, a first communication cost, and a first communication-related resource, the second satellite has a second communication coverage narrower than the first communication coverage, a second communication cost less than the first communication cost, and a second communication-related resource that is smaller than the first communication-related resource, the third satellite has a third communication coverage narrower than the second communication coverage, a third communication cost less than the second communication cost, and a third communication-related resource smaller than the second communication-related resource, and the communication method includes transmitting, by the mobile node, an offloading task to one or more of the first satellite, the second satellite, and the third satellite.

The second satellite may have the second communication coverage within the first communication coverage of the first satellite, the third satellite may have the third communication coverage within the second communication coverage of the second satellite, and each of the first satellite, the second satellite, and the third satellite may be prepared to support a mobile edge computing (MEC) function.

Each of the first satellite, the second satellite, and the third satellite may include a computing unit for processing the offloading task and a scheduler for scheduling an order of the offloading tasks.

The communication may further include checking, by the first satellite, whether the second satellite and the third satellite are present within the first communication coverage of the first satellite, when receiving an offloading task from the mobile node, and allocating, by the first satellite, the offloading task to one or more of the second and third satellites within the first communication coverage.

In the allocating of the offloading task, the offloading task may be allocated to one or more of the second satellite and the third satellite in consideration of one or more of a communication-related resource, a communication bandwidth, a communication cost, and an offloading task processing deadline of the second and third satellites within the first communication coverage.

In the allocating of the offloading task, selection of a satellite to perform the offloading task, the communication bandwidth, and allocation of the communication-related resource may be optimized while minimizing a processing time of the offloading task and a communication cost, and the selection of the satellite to perform the offloading task, the communication bandwidth, and the allocation of the communication-related resource may be optimized using a multi-agent reinforcement learning model in which each satellite serves as an agent.

The multi-agent reinforcement learning model may include a policy network that decides an action of the agent based on a preset policy for input state information, and a value network that provides feedback on the action decided by the policy network to update the policy, the state information may include satellite state information and node state information, the satellite state information may include one or more of a location of each satellite, a communication-related resource of each satellite, a communication bandwidth of each satellite, a communication cost of each satellite, and a communication range of each satellite, and the node state information may include one or more of a location of each mobile node, an offloading workload requested by each mobile node, and a deadline of the offloading task set by each mobile node.

The multi-agent reinforcement learning model may further include an attention network that receives the satellite state information, the node state information, and the action decided by the policy network, and generates an attention weight of other agents related to reward for the action based on the satellite state information, the node state information, and the action decided by the policy network.

A system according to still another exemplary embodiment of the present disclosure is an intelligent transportation system using satellites, and includes a first satellite located at a first altitude above the ground and having a first communications coverage, one or more second satellites located at a second altitude lower than the first altitude and having a second coverage narrower than the first communication coverage, one or more third satellites located at a third altitude lower than the second altitude and having a third coverage narrower than the second communication coverage, and one or more mobile nodes that perform data communication with one or more of the first satellite, the second satellite, and the third satellite, and are means of transportation equipped with communication equipment, in which the mobile node transmits the offloading task to one or more of the first satellite, the second satellite, and the third satellite.

DETAILED DESCRIPTION

Hereinafter, a specific embodiment of the present disclosure will be described with reference to the drawings. The following detailed description is provided to aid in a comprehensive understanding of the methods, apparatus and/or systems described herein. However, this is illustrative only, and the present disclosure is not limited thereto.

In describing the embodiments of the present disclosure, when it is decided that a detailed description of related known technologies may unnecessarily obscure the subject matter of the present disclosure, a detailed description thereof will be omitted. In addition, terms to be described later are terms defined in consideration of functions in the present disclosure, which may vary according to the intention or custom of users or operators. Therefore, the definition should be made based on the contents throughout this specification. The terms used in the detailed description are only for describing embodiments of the present disclosure, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, some or combinations thereof, other than those described.

In the following description, "transfer," "communication," "transmission," "reception," of a signal or information and other terms having similar meaning include not only direct transmission of a signal or information from one component to another component, but also transmission of the signal or information through another component. In particular, "transferring" or "transmitting" a signal or information to a component indicates a final destination of the signal or information and does not mean a direct destination. This is the same for "receiving" a signal or information. In addition, in this specification, the fact that two or more pieces of data or information are "related" means that if one data (or information) is acquired, at least part of the other data (or information) can be obtained based on it.

Additionally, terms such as first, second, etc. may be used to describe various components, but the components should not be limited by the terms. Terms may be used for the purpose of distinguishing one component from another. For example, a first component may be referred to as a second component, and similarly, the second component may also be referred to as a first component without departing from the scope of the present disclosure.

Figure 1:
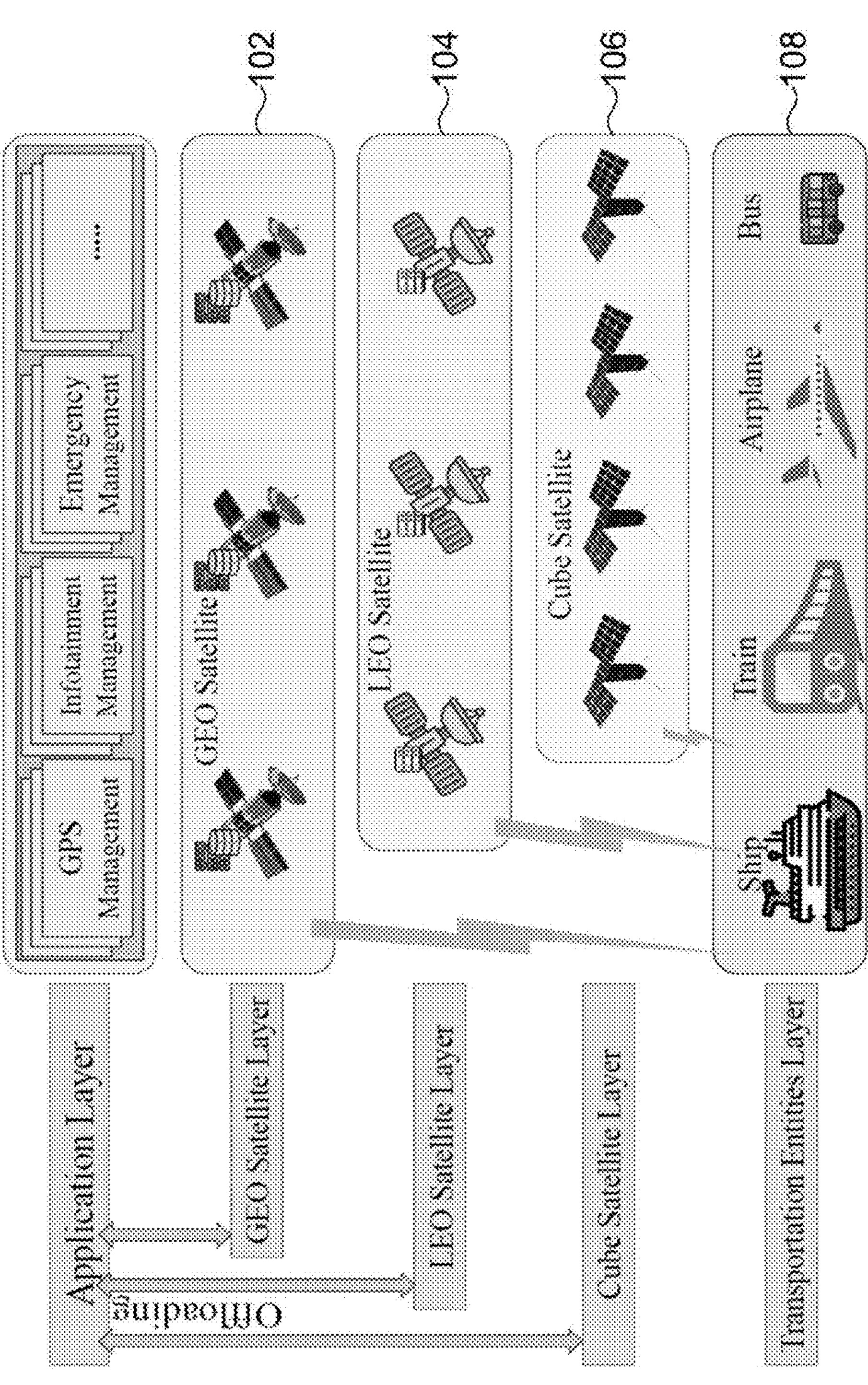
FIG. 1 is a diagram schematically illustrating a service architecture of an intelligent transportation system using a multi-layer satellite according to an embodiment of the present disclosure.
Figure 2:
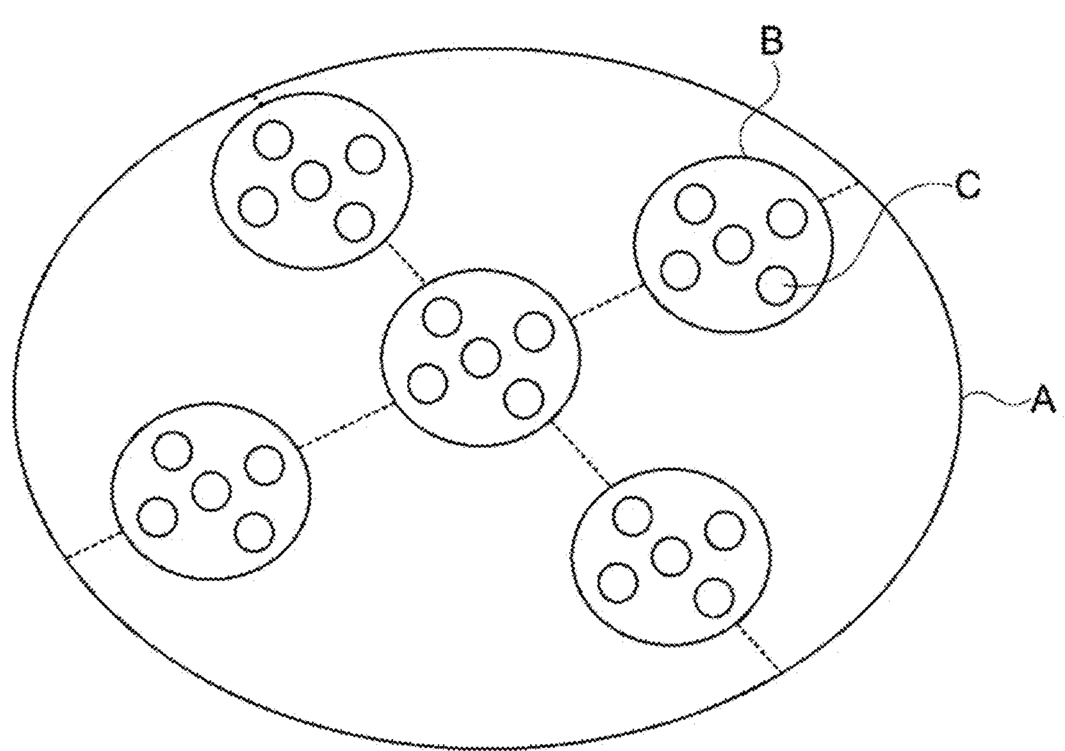
FIG. 2 is a diagram schematically illustrating a communication range of multi-layer satellites according to an embodiment of the present disclosure.

FIG. 1 is a diagram schematically illustrating a service architecture of an intelligent transportation system using a multi-layer satellite according to an embodiment of the present disclosure, and FIG. 2 is a diagram schematically illustrating a communication range of multi-layer satellites according to an embodiment of the present disclosure.

Referring to FIGS. 1 and 2, an intelligent transportation system 100 may include a first satellite 102, a second satellite 104, a third satellite 106, and a mobile node 108. The intelligent transportation system 100 may perform one or more of an offloading task and a computing service of the mobile node 108 using the first satellite 102, the second satellite 104, and the third satellite 106.

Each of the first satellite 102, the second satellite 104, the third satellite 106, and the mobile node 108 has an application layer. In FIG. 1, the application layer is shown separately for convenience of description. The application layer can handle a variety of intelligent transportation system (ITS) functions including traffic light control, abnormal traffic detection, weather updates, GPS information updates, emergency notifications, traffic flow predictions, etc. These functions may be processed using data collected from each mobile node 108.

The first satellite 102 may be a satellite having a first communication coverage A. The first satellite 102 is a satellite having the widest coverage at the highest altitude among the satellites and may be a geostationary earth orbit (GEO) satellite. The mobile node 108 may transmit the offloading task to the first satellite 102 and pay a first communication fee for using the first satellite 102. The first satellite 102 may have the largest number of communication-related resources (e.g., channels, power, computing resources, etc.) among the satellites. The first satellite 102 may be a satellite in a layer having the largest communication coverage and communication-related resources.

The second satellite 104 may be a satellite having a second communication coverage B that is narrower than the first communication coverage A. The second satellite 104 may have the second communication coverage B within the first communication coverage A of the first satellite 102. One or more second satellites 104 may be located within the first communication coverage A. The second satellite 104 may be a satellite having a lower altitude than the first satellite 102. In one embodiment, the second satellite 104 may be a low earth orbit (LEO) satellite or a middle earth orbit (MEO) satellite.

The mobile node 108 may transmit the offloading task to the second satellite 104 and pay a second communication cost, which is less than the first communication cost, for using the second satellite 104. The second satellite 104 may have second communication-related resources that are smaller than the first communication-related resources. The second satellite 104 may be a satellite of a layer with a medium communication coverage and communication-related resources.

The third satellite 106 may be a satellite having a third communication coverage C that is narrower than the second communication coverage B. The third satellite 106 may have the third communication coverage C within the second communication coverage B of the second satellite 104. One or more third satellites 106 may be located within the second communication coverage B. The third satellite 106 may be a satellite having a lower altitude than the second satellite 104. In one embodiment, the third satellite 106 may be a cube satellite (i.e., CubeSat).

The mobile node 108 may transmit the offloading task to the third satellite 106 and pay a third communication cost, which is less than the second communication cost, for using the third satellite 106. The third satellite 106 may have a third communication-related resource that is smaller than the second communication-related resource. The third satellite 106 may be a satellite of a layer with the smallest communication coverage and communication-related resources.

The mobile node 108 may perform data communication using the first satellite 102, the second satellite 104, and the third satellite 106. The mobile node 108 may have functions of collecting, generating, and processing data. In one embodiment, the mobile node 108 may be means of transportation (e.g., aircraft, ships, trains, vehicles, etc.) equipped with communication equipment. The mobile node 108 may be equipped with various types of sensors and collect various types of data.

Here, each of the first satellite 102, the second satellite 104, and the third satellite 106 may be prepared to support the mobile edge computing (MEC) function. In one embodiment, the first satellite 102, the second satellite 104, and the third satellite 106 may be prepared to receive and process the offloading task of the mobile node 108. To this end, each of the first satellite 102, the second satellite 104, and the third satellite 106 may include a computing unit for processing the offloading task and a scheduler for scheduling the order of the offloading tasks.

The first satellite 102 can serve as a core network server of the backbone network. When the second satellite 104 and the third satellite 106 are not present within the first communication coverage, the first satellite 102 may directly receive and process the offloading task of the mobile node 108.

The mobile node 108 can communicate with the first satellite 102 at any time to transmit the offloading task due to global connectivity availability, but using the first satellite 102 should pay a higher communication cost than when using the second satellite 104 or the third satellite 106. Additionally, the second satellite 104 and the third satellite 106 are closer to the Earth's surface than the first satellite 102 and have shorter delay times, and thus they are also practical for performing the offloading task.

Accordingly, when receiving the offloading task from the mobile node 108, the first satellite 102 may check whether the second satellite 104 and the third satellite 106 are present within the first communication coverage and offload the task to one or more of the second satellite 104 and the third satellite 106 located within the first communication coverage. In this case, the first satellite 102 may allocate the offloading task to one or more of the second satellite 104 and the third satellite 106 in consideration of the workload of the subtask (i.e., offloading workload), communication-related resources of the second satellite 104 and the third satellite 106, the communication bandwidth, and the offloading processing deadline, etc.

Here, it is required to optimize the selection of satellites to perform the offloading task, communication bandwidth, and allocation of communication-related resources while minimizing the processing time of the offloading task and the communication cost. In the disclosed embodiment in order to solve this optimization problem, a multi-agent reinforcement learning model in which each satellite serves as a distributed agent can be used. A detailed description of this will be provided later.

Figure 3:
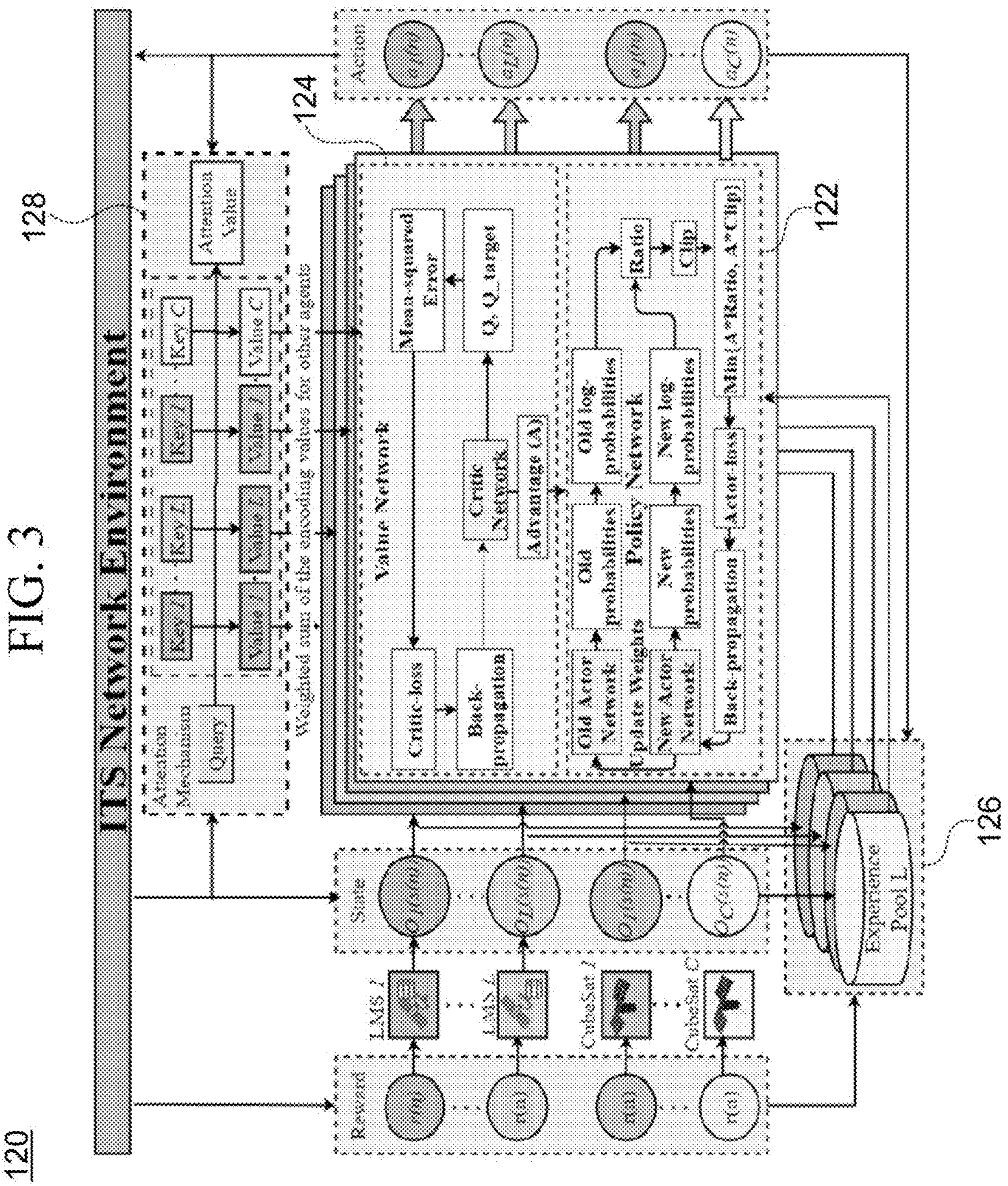
FIG. 3 is a schematic diagram for multi-agent reinforcement learning according to an embodiment of the present disclosure.

FIG. 3 illustrates a schematic diagram for multi-agent reinforcement learning according to an embodiment of the present disclosure. Referring to FIG. 3, the intelligent transportation system (ITS) network environment may mean the entire network environment including all information of the first satellite 102, the second satellite 104, the third satellite 106, and the mobile node 108.

Information within the network can be used to jointly train each satellite (agent). Each agent may receive the observation of the state from the network environment. Here, each satellite serves as an agent. Hereinafter, the terms satellite and agent may be used interchangeably. The multi-agent reinforcement learning model may be installed on each satellite. In this case, each of the satellites can perform deep reinforcement learning on the model through cooperative multi-agent proximal policy optimization.

A multi-agent reinforcement learning model 120 may have a policy network 122 and a value network 124. Here, the policy network 122 and the value network 124 may be artificial neural networks for multi-agent reinforcement learning. The value network 124 can serve as a local critic for each agent. The value network 124 may provide immediate feedback on the accuracy of each agent (satellite) when the agent learns a new policy. The policy network 122 may serve as a learning unit for a major policy. The policy may be used by each agent to make decisions (i.e., actions).

The actions taken by each agent in a distributed manner can be used for evaluation by the critic. The critic guarantees cooperation between all agents, and may calculate the global loss of all agents and may ensure that the performance of the system is globally converged. In order to analyze the results of distributed agent, the current reward can be sent to the critic, and each reward and state can be stored in an experience pool 126.

The policy network 122 may be referred to as an actor, and the value network 124 may be referred to as a critic. The policy network (actor) 122 may be a neural network that decides the action based on a preset policy for an input state. The value network (critic) 124 may be a neural network that provides feedback on the action decided by the policy network 122 to update the policy of the policy network 122. The policy network 122 (i.e., actor) only sees local information (i.e., information on the corresponding agent) and generates an action based on it, but the value network 124 (i.e., critic) can see the entire information of other agents (i.e., other satellites) in order to better optimize itself.

State information input to the multi-agent reinforcement learning model 120 may include satellite state information and node state information. The satellite state information is state information for each satellite and may include the location of each satellite (altitude, elevation angle, azimuth, etc.), computing resources of each satellite (e.g., CPU processing speed, amount of memory, and amount of remaining memory, etc.), the communication bandwidth of each satellite, the communication cost of each satellite, the communication range of each satellite, etc. The node state information is state information for each mobile node and may include the location of the mobile node, the offloading workload requested by the mobile node, the deadline for the offloading task set by the mobile node, etc. Each mobile node may transmit its node state information to the satellite. Each satellite may transmit the state information including the satellite state information and the node state information to the multi-agent reinforcement learning model 120.

After each satellite (agent) obtains optimal power in its region of responsibility, each satellite can transmit state information (including satellite state information and node state information) to the policy network 122. The policy network 122 may decide the action based on the state information. The policy network 122 may generate an action probability based on the state information, then sample the distribution of actions interacting with the local environment according to the action probability and receive a reward before moving to the next state. In this case, the reward can be immediate reward for data throughput and the quality of service (QOS) fairness.

Each satellite can decide the action that change one or more of the location, computing resources, and communication bandwidth of the satellite. In this case, the decided action is obtained from the policy of the multi-agent reinforcement learning model 120, and can be trained through a reinforcement learning algorithm.

When the agent executes an action, the state changes according to the action probability (or action distribution) of the executed action. In this case, the reward is received from the network environment, and the corresponding experience is stored in the experience pool 126. Additionally, a global reward can be received to strengthen the cooperation of each agent. The global reward is shared by all agents, and the reinforcement learning model 120 can be trained to maximize the global reward through an optimal action.

Meanwhile, the multi-agent reinforcement learning model 120 may further include an attention network 128. State information (satellite state information and node state information) observed from the network environment and actions decided by the policy network 122 may be respectively input to the attention network 128. While learning the policy through the attention network 128, each agent can generate an attention weight that indicates the influence or importance of other agents in relation to the reward for the action decided by the agent. That is, the attention network 128 may generate queries based on the state information and action, and set priorities for other agents by generating attention weights for other agents through a key-value function.

According to the embodiments of the present disclosure, within the 6G network, the offloading and computing functions of the satellite-based intelligent transportation system (ITS) can be integrated and performed, and overall performance can be improved by optimizing the allocation of network resources. Additionally, the use of multi-layer satellite network provides additional spectral resources to provide improved broadband services.

Figure 4:
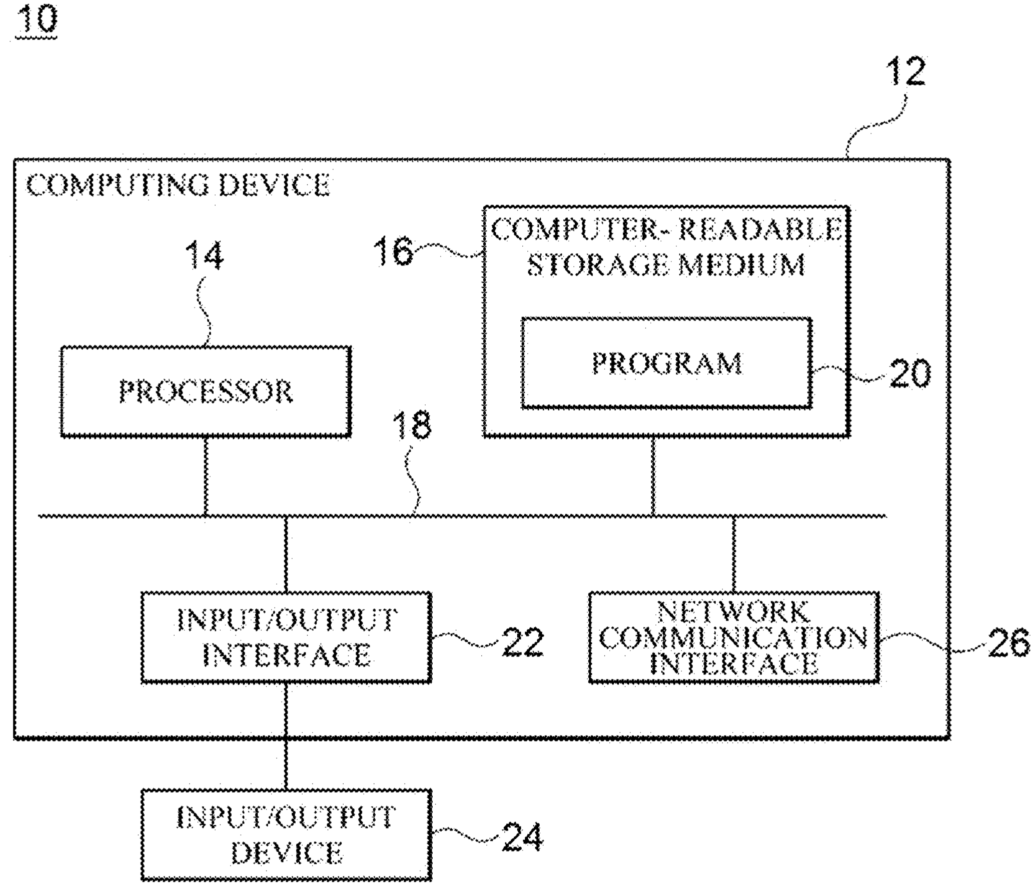
FIG. 4 is a block diagram illustratively describing a computing environment including a computing device suitable for use in exemplary embodiments.

FIG. 4 is a block diagram for illustratively describing a computing environment 10 including a computing device suitable for use in exemplary embodiments. In the illustrated embodiment, respective components may have different functions and capabilities other than those described below, and may include additional components in addition to those described below.

The illustrated computing environment 10 includes a computing device 12. In one embodiment, the computing device 12 may be the first satellite 102. Additionally, the computing device 12 may be the second satellite 104. Additionally, the computing device 12 may be the third satellite 106. The computing device 12 may also be the mobile node 108.

The computing device 12 includes at least one processor 14, a computer-readable storage medium 16, and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured so that the computing device 12 performs operations according to the exemplary embodiment.

The computer-readable storage medium 16 is configured so that the computer-executable instruction or program code, program data, and/or other suitable forms of information are stored. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a speech or sound input device, input devices such as various types of sensor devices and/or photographing devices, and/or output devices such as a display device, a printer, a speaker, and/or a network card. The exemplary input/output device 24 may be included inside the computing device 12 as a component configuring the computing device 12, or may be connected to the computing device 12 as a separate device distinct from the computing device 12.

According to embodiments of the present disclosure, within a 6G network, offloading and computing functions of a satellite-based intelligent transportation system (ITS) can be integrated and performed, and overall performance can be improved by optimizing the allocation of network resources. Additionally, the use of a multi-layer satellite networks provides additional spectral resources to provide improved broadband services.

Although representative embodiments of the present disclosure have been described in detail, a person skilled in the art to which the present disclosure pertains will understand that various modifications may be made thereto within the limits that do not depart from the scope of the present disclosure. Therefore, the scope of rights of the present disclosure should not be limited to the described embodiments, but should be defined not only by claims set forth below but also by equivalents to the claims.

What is claimed is:

1. An intelligent transportation system comprising:

a first satellite;

a second satellite that is different from the first satellite in one or more of a communication coverage, a communication cost, and a communication-related resource;

a third satellite that is different from the first satellite and the second satellite in one or more of the communication coverage, the communication cost, and the communication-related resource; and one or more mobile nodes configured to perform data communication with one or more of the first satellite, the second satellite, and the third satellite, the one or more mobile nodes being a transportation equipped with communication equipment, wherein the first satellite has a first communication coverage, a first communication cost, and a first communication-related resource, the second satellite has a second communication coverage narrower than the first communication coverage, a second communication cost less than the first communication cost, and a second communication-related resource that is smaller than the first communication-related resource, and the third satellite has a third communication coverage narrower than the second communication coverage, a third communication cost less than the second communication cost, and a third communication-related resource smaller than the second communication-related resource, wherein the second satellite has the second communication coverage within the first communication coverage of the first satellite, the third satellite has the third communication coverage within the second communication coverage of the second satellite, each of the first satellite, the second satellite, and the third satellite is prepared to support a mobile edge computing (MEC) function, and the mobile node transmits an offloading task to one or more of the first satellite, the second satellite, and the third satellite.

2. The intelligent transportation system of claim 1, wherein each of the first satellite, the second satellite, and the third satellite includes a computing unit for processing the offloading task and a scheduler for scheduling an order of the offloading tasks.

3. The intelligent transportation system of claim 1, wherein the first satellite is configured to, when receiving the offloading task from the mobile node, check whether the second satellite and the third satellite are present within the first communication coverage of the first satellite and allocate the offloading task to one or more of the second and third satellites within the first communication coverage.

4. The intelligent transportation system of claim 3, wherein the first satellite is configured to allocate the offloading task to one or more of the second satellite and the third satellite in consideration of one or more of a communication-related resource, communication bandwidths, communication costs, and offloading task processing deadlines of the second and third satellites within the first communication coverage.

5. The intelligent transportation system of claim 4, wherein the first satellite is configured to optimize selection of a satellite to perform the offloading task, the communication bandwidth, and allocation of the communication-related resource while minimizing a processing time of the offloading task and the communication cost, and optimizes the selection of the satellite to perform the offloading task, the communication bandwidth, and the allocation of the communication-related resource using a multi-agent reinforcement learning model in which each satellite serves as an agent.

6. The intelligent transportation system of claim 5, wherein the multi-agent reinforcement learning model includes a policy network that decides an action of the agent based on a preset policy for input state information, and a value network that provides feedback on the action decided by the policy network to update the policy, the state information includes satellite state information and node state information, the satellite state information includes one or more of a location of each satellite, a communication-related resource of each satellite, a communication bandwidth of each satellite, a communication cost of each satellite, and a communication range of each satellite, and the node state information includes one or more of a location of each mobile node, an offloading workload requested by each mobile node, and a deadline of the offloading task set by each mobile node.

7. The intelligent transportation system of claim 6, wherein the multi-agent reinforcement learning model further includes an attention network that receives the satellite state information, the node state information, and the action decided by the policy network, and generates an attention weight of other agents related to reward for the action based on the satellite state information, the node state information, and the action decided by the policy network.

8. A communication method of an intelligent transportation system including a first satellite, a second satellite, a third satellite, and a mobile node, wherein the first satellite has a first communication coverage, a first communication cost, and a first communication-related resource, the second satellite has a second communication coverage narrower than the first communication coverage, a second communication cost less than the first communication cost, and a second communication-related resource that is smaller than the first communication-related resource, the third satellite has a third communication coverage narrower than the second communication coverage, a third communication cost less than the second communication cost, and a third communication-related resource smaller than the second communication-related resource, the communication method comprising:

transmitting, by the mobile node, an offloading task to one or more of the first satellite, the second satellite, and the third satellite, wherein the second satellite has the second communication coverage within the first communication coverage of the first satellite, the third satellite has the third communication coverage within the second communication coverage of the second satellite, and each of the first satellite, the second satellite, and the third satellite is prepared to support a mobile edge computing (MEC) function.

9. The communication method of claim 8, wherein each of the first satellite, the second satellite, and the third satellite includes a computing unit for processing the offloading task and a scheduler for scheduling an order of the offloading tasks.

10. The communication method of claim 8, further comprising:

checking, by the first satellite, whether the second satellite and the third satellite are present within the first communication coverage of the first satellite, when receiving an offloading task from the mobile node; and allocating, by the first satellite, the offloading task to one or more of the second and third satellites within the first communication coverage.

11. The communication method of claim 10, wherein, in the allocating of the offloading task, the offloading task is allocated to one or more of the second satellite and the third satellite in consideration of one or more of a communication-related resource, a communication bandwidth, a communication cost, and an offloading task processing deadline of the second and third satellites within the first communication coverage.

12. The communication method of claim 11, wherein, in the allocating of the offloading task, selection of a satellite to perform the offloading task, the communication bandwidth, and allocation of the communication-related resource is optimized while minimizing a processing time of the offloading task and a communication cost, and the selection of the satellite to perform the offloading task, the communication bandwidth, and the allocation of the communication-related resource is optimized using a multi-agent reinforcement learning model in which each satellite serves as an agent.

13. The communication method of claim 12, wherein the multi-agent reinforcement learning model includes a policy network that decides an action of the agent based on a preset policy for input state information, and a value network that provides feedback on the action decided by the policy network to update the policy, the state information includes satellite state information and node state information, the satellite state information includes one or more of a location of each satellite, a communication-related resource of each satellite, a communication bandwidth of each satellite, a communication cost of each satellite, and a communication range of each satellite, and the node state information includes one or more of a location of each mobile node, an offloading workload requested by each mobile node, and a deadline of the offloading task set by each mobile node.

14. The communication method of claim 13, wherein the multi-agent reinforcement learning model further includes an attention network that receives the satellite state information, the node state information, and the action decided by the policy network, and generates an attention weight of other agents related to reward for the action based on the satellite state information, the node state information, and the action decided by the policy network.

15. An intelligent transportation system comprising:

a first satellite located at a first altitude above the ground and having a first communications coverage;

one or more second satellites located at a second altitude lower than the first altitude and having a second coverage narrower than the first communication coverage;

one or more third satellites located at a third altitude lower than the second altitude and having a third coverage narrower than the second communication coverage; and one or more mobile nodes configured to perform data communication with one or more of the first satellite, the second satellite, and the third satellite, the one or more mobile nodes configured to be a transportation equipped with communication equipment, the one or more mobile nodes configured to transmit the offloading task to one or more of the first satellite, the second satellite, and the third satellite, wherein the second satellite has the second communication coverage within the first communication coverage of the first satellite, the third satellite has the third communication coverage within the second communication coverage of the second satellite, and each of the first satellite, the second satellite, and the third satellite is prepared to support a mobile edge computing (MEC) function.

* * * * *